US011055159B2

(12) United States Patent
Ganapathy et al.

(10) Patent No.: US 11,055,159 B2
(45) Date of Patent: *Jul. 6, 2021

(54) SYSTEM AND METHOD FOR SELF-HEALING OF APPLICATION CENTRIC INFRASTRUCTURE FABRIC MEMORY

(71) Applicant: Cisco Technology, Inc., San Jose, CA (US)

(72) Inventors: Sivakumar Ganapathy, Fremont, CA (US); Ram Regar, Milpitas, CA (US); Navya Patimalla, Karnataka (IN); Sohayb Aiyub, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/393,067

(22) Filed: Apr. 24, 2019

(65) Prior Publication Data
US 2019/0250972 A1 Aug. 15, 2019

Related U.S. Application Data

(63) Continuation of application No. 15/654,906, filed on Jul. 20, 2017, now Pat. No. 10,303,534.

(51) Int. Cl.
*G06F 11/07* (2006.01)
*G06F 12/02* (2006.01)
(Continued)

(52) U.S. Cl.
CPC ........ *G06F 11/0715* (2013.01); *G06F 9/5077* (2013.01); *G06F 11/0751* (2013.01);
(Continued)

(58) Field of Classification Search
CPC ............. G06F 11/0715; G06F 11/0751; G06F 11/0793
See application file for complete search history.

(56) References Cited

U.S. PATENT DOCUMENTS 4,688,695 A 8/1987 Hirohata
5,263,003 A 11/1993 Cowles et al.
(Continued)

FOREIGN PATENT DOCUMENTS

EP 2228719 9/2010
EP 2439637 4/2012
(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.
(Continued)

*Primary Examiner* — Nadeem Iqbal
(74) *Attorney, Agent, or Firm* — Polsinelli PC

(57) ABSTRACT

Disclosed is a method that includes obtaining a list of processes in an application centric infrastructure fabric, sorting the list of processes according to an amount of memory increase associated with each respective process in the list of processes to yield a sorted list, selecting a group of processes from the sorted list and collecting a respective live process core for each process in the group of processes without pausing or killing any process in the group of processes. The method includes applying an offline leak detection tool to each process in the group of processes to yield a list of leaked memory addresses for a given process of the group of processes and transmitting a message to the given process with the list of leaked memory addresses, whereby the given process calls a function to release leaked memory associated with the given process as identified in the message.

18 Claims, 5 Drawing Sheets

(51) Int. Cl.
*G06F 9/50* (2006.01)
*G06F 11/36* (2006.01)
(52) U.S. Cl.
CPC ...... *G06F 11/0793* (2013.01); *G06F 11/3648* (2013.01); *G06F 12/0253* (2013.01); *G06F 12/0269* (2013.01); *G06F 2212/152* (2013.01); *G06F 2212/154* (2013.01); *G06F 2212/163* (2013.01)

(56) References Cited

U.S. PATENT DOCUMENTS

| | | | |
|---|---|---|---|
| 5,339,445 A | 8/1994 | Gasztonyi | |
| 5,430,859 A | 7/1995 | Norman et al. | |
| 5,457,746 A | 10/1995 | Dolphin | |
| 5,535,336 A | 7/1996 | Smith et al. | |
| 5,588,012 A | 12/1996 | Oizumi | |
| 5,617,421 A | 4/1997 | Chin et al. | |
| 5,680,579 A | 10/1997 | Young et al. | |
| 5,690,194 A | 11/1997 | Parker et al. | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,812,814 A | 9/1998 | Sukegawa | |
| 5,812,950 A | 9/1998 | Tom | |
| 5,838,970 A | 11/1998 | Thomas | |
| 5,999,930 A | 12/1999 | Wolff | |
| 6,035,105 A | 3/2000 | McCloghrie et al. | |
| 6,043,777 A | 3/2000 | Bergman et al. | |
| 6,101,497 A | 8/2000 | Ofek | |
| 6,148,414 A | 11/2000 | Brown et al. | |
| 6,185,203 B1 | 2/2001 | Berman | |
| 6,188,694 B1 | 2/2001 | Fine et al. | |
| 6,202,135 B1 | 3/2001 | Kedem et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,219,753 B1 | 4/2001 | Richardson | |
| 6,223,250 B1 | 4/2001 | Yokono | |
| 6,226,771 B1 | 5/2001 | Hilla et al. | |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 6,400,730 B1 | 6/2002 | Latif et al. | |
| 6,408,406 B1 | 6/2002 | Parris | |
| 6,542,909 B1 | 4/2003 | Tamer et al. | |
| 6,542,961 B1 | 4/2003 | Matsunami et al. | |
| 6,553,390 B1 | 4/2003 | Gross et al. | |
| 6,564,252 B1 | 5/2003 | Hickman et al. | |
| 6,647,474 B2 | 11/2003 | Yanai Moshe et al. | |
| 6,675,258 B1 | 1/2004 | Bramhall et al. | |
| 6,683,883 B1 | 1/2004 | Czeiger et al. | |
| 6,694,413 B1 | 2/2004 | Mimatsu et al. | |
| 6,708,227 B1 | 3/2004 | Cabrera et al. | |
| 6,715,007 B1 | 3/2004 | Williams et al. | |
| 6,728,791 B1 | 4/2004 | Young | |
| 6,772,231 B2 | 8/2004 | Reuter et al. | |
| 6,820,099 B1 | 11/2004 | Huber et al. | |
| 6,847,647 B1 | 1/2005 | Wrenn | |
| 6,848,759 B2 | 2/2005 | Doornbos et al. | |
| 6,850,955 B2 | 2/2005 | Sonoda et al. | |
| 6,876,656 B2 | 4/2005 | Brewer et al. | |
| 6,880,062 B1 | 4/2005 | Ibrahim et al. | |
| 6,898,670 B2 | 5/2005 | Nahum | |
| 6,907,419 B1 | 6/2005 | Pesola et al. | |
| 6,912,668 B1 | 6/2005 | Brown et al. | |
| 6,952,734 B1 | 10/2005 | Gunlock et al. | |
| 6,976,090 B2 | 12/2005 | Ben-Shaul et al. | |
| 6,978,300 B1 | 12/2005 | Beukema et al. | |
| 6,983,303 B2 | 1/2006 | Pellegrino et al. | |
| 6,986,015 B2 | 1/2006 | Testardi | |
| 6,986,069 B2 | 1/2006 | Oehler et al. | |
| 7,051,056 B2 * | 5/2006 | Rodriguez-Rivera | G06F 12/0253 |
| 7,069,465 B2 | 6/2006 | Chu et al. | |
| 7,073,017 B2 | 7/2006 | Yamamoto | |
| 7,108,339 B2 | 9/2006 | Berger | |
| 7,149,858 B1 | 12/2006 | Kiselev | |
| 7,171,514 B2 | 1/2007 | Coronado et al. | |
| 7,171,668 B2 | 1/2007 | Molloy et al. | |
| 7,174,354 B2 | 2/2007 | Andreasson | |
| 7,200,144 B2 | 4/2007 | Terrell et al. | |
| 7,222,255 B1 | 5/2007 | Claessens et al. | |
| 7,237,045 B2 | 6/2007 | Beckmann et al. | |
| 7,240,188 B2 | 7/2007 | Takata et al. | |
| 7,246,260 B2 | 7/2007 | Brown et al. | |
| 7,266,718 B2 | 9/2007 | Idei et al. | |
| 7,269,168 B2 | 9/2007 | Roy et al. | |
| 7,277,431 B2 | 10/2007 | Walter et al. | |
| 7,277,948 B2 | 10/2007 | Igarashi et al. | |
| 7,305,658 B1 | 12/2007 | Hamilton et al. | |
| 7,328,434 B2 | 2/2008 | Swanson et al. | |
| 7,340,555 B2 | 3/2008 | Ashmore et al. | |
| 7,346,751 B2 | 3/2008 | Prahlad et al. | |
| 7,352,706 B2 | 4/2008 | Klotz et al. | |
| 7,353,305 B2 | 4/2008 | Pangal et al. | |
| 7,359,321 B1 | 4/2008 | Sindhu et al. | |
| 7,383,381 B1 | 6/2008 | Faulkner et al. | |
| 7,403,987 B1 | 7/2008 | Marinelli et al. | |
| 7,433,326 B2 | 10/2008 | Desai et al. | |
| 7,433,948 B2 | 10/2008 | Edsall | |
| 7,434,105 B1 | 10/2008 | Rodriguez-Rivera et al. | |
| 7,441,154 B2 | 10/2008 | Klotz et al. | |
| 7,447,839 B2 | 11/2008 | Uppala | |
| 7,487,321 B2 | 2/2009 | Muthiah et al. | |
| 7,500,053 B1 | 3/2009 | Kavuri et al. | |
| 7,512,744 B2 | 3/2009 | Banga et al. | |
| 7,542,681 B2 | 6/2009 | Cornell et al. | |
| 7,558,872 B1 | 7/2009 | Senevirathne et al. | |
| 7,587,570 B2 | 9/2009 | Sarkar et al. | |
| 7,631,023 B1 | 12/2009 | Kaiser et al. | |
| 7,643,505 B1 | 1/2010 | Colloff | |
| 7,654,625 B2 | 2/2010 | Amann et al. | |
| 7,657,796 B1 | 2/2010 | Kaiser et al. | |
| 7,668,981 B1 | 2/2010 | Nagineni et al. | |
| 7,669,071 B2 | 2/2010 | Cochran et al. | |
| 7,689,384 B1 | 3/2010 | Becker | |
| 7,694,092 B2 | 4/2010 | Mizuno | |
| 7,697,554 B1 | 4/2010 | Ofer et al. | |
| 7,706,303 B2 | 4/2010 | Bose et al. | |
| 7,707,481 B2 | 4/2010 | Kirschner et al. | |
| 7,716,648 B2 | 5/2010 | Vaidyanathan et al. | |
| 7,752,360 B2 | 7/2010 | Galles | |
| 7,757,059 B1 | 7/2010 | Ofer et al. | |
| 7,774,329 B1 | 8/2010 | Peddy et al. | |
| 7,774,839 B2 | 8/2010 | Nazzal | |
| 7,793,138 B2 | 9/2010 | Rastogi et al. | |
| 7,827,538 B2 | 11/2010 | Trotter | |
| 7,840,730 B2 | 11/2010 | D'Amato et al. | |
| 7,843,906 B2 | 11/2010 | Chidambaram et al. | |
| 7,895,428 B2 | 2/2011 | Boland, IV et al. | |
| 7,904,599 B1 | 3/2011 | Bennett | |
| 7,930,494 B1 | 4/2011 | Goheer et al. | |
| 7,975,175 B2 | 7/2011 | Votta et al. | |
| 7,979,670 B2 | 7/2011 | Saliba et al. | |
| 7,984,259 B1 | 7/2011 | English | |
| 8,031,703 B2 | 10/2011 | Gottumukkula et al. | |
| 8,032,621 B1 | 10/2011 | Upalekar et al. | |
| 8,051,197 B2 | 11/2011 | Mullendore et al. | |
| 8,086,755 B2 | 12/2011 | Duffy, IV et al. | |
| 8,161,134 B2 | 4/2012 | Mishra et al. | |
| 8,196,018 B2 | 6/2012 | Forhan et al. | |
| 8,205,951 B2 | 6/2012 | Boks | |
| 8,218,538 B1 | 7/2012 | Chidambaram et al. | |
| 8,230,066 B2 | 7/2012 | Heil | |
| 8,234,377 B2 | 7/2012 | Cohn | |
| 8,266,238 B2 | 9/2012 | Zimmer et al. | |
| 8,272,104 B2 | 9/2012 | Chen et al. | |
| 8,274,993 B2 | 9/2012 | Sharma et al. | |
| 8,290,919 B1 | 10/2012 | Kelly et al. | |
| 8,297,722 B2 | 10/2012 | Chambers et al. | |

(56) References Cited

U.S. PATENT DOCUMENTS

| | | | |
|---|---|---|---|
| 8,301,746 B2 | 10/2012 | Head et al. | |
| 8,335,231 B2 | 12/2012 | Kloth et al. | |
| 8,341,121 B1 | 12/2012 | Claudatos et al. | |
| 8,345,692 B2 | 1/2013 | Smith | |
| 8,352,941 B1 | 1/2013 | Protopopov et al. | |
| 8,392,760 B2 | 3/2013 | Kandula et al. | |
| 8,423,718 B2 | 4/2013 | Tsai et al. | |
| 8,442,059 B1 | 5/2013 | de la Iglesia et al. | |
| 8,479,211 B1 | 7/2013 | Marshall et al. | |
| 8,495,356 B2 | 7/2013 | Ashok et al. | |
| 8,514,868 B2 | 8/2013 | Hill | |
| 8,532,108 B2 | 9/2013 | Li et al. | |
| 8,560,663 B2 | 10/2013 | Baucke et al. | |
| 8,619,599 B1 | 12/2013 | Even | |
| 8,626,891 B2 | 1/2014 | Guru et al. | |
| 8,630,983 B2 | 1/2014 | Sengupta et al. | |
| 8,660,129 B1 | 2/2014 | Brendel et al. | |
| 8,661,299 B1 | 2/2014 | Ip | |
| 8,677,485 B2 | 3/2014 | Sharma et al. | |
| 8,683,296 B2 | 3/2014 | Anderson et al. | |
| 8,706,772 B2 | 4/2014 | Hartig et al. | |
| 8,719,804 B2 | 5/2014 | Jain | |
| 8,725,854 B2 | 5/2014 | Edsall | |
| 8,768,981 B1 | 7/2014 | Milne et al. | |
| 8,775,773 B2 | 7/2014 | Acharya et al. | |
| 8,793,372 B2 | 7/2014 | Ashok et al. | |
| 8,805,918 B1 | 8/2014 | Chandrasekaran et al. | |
| 8,805,951 B1 | 8/2014 | Faibish et al. | |
| 8,832,330 B1 | 9/2014 | Lancaster | |
| 8,855,116 B2 | 10/2014 | Rosset et al. | |
| 8,856,339 B2 | 10/2014 | Mestery et al. | |
| 8,868,474 B2 | 10/2014 | Leung et al. | |
| 8,887,286 B2 | 11/2014 | Dupont et al. | |
| 8,898,385 B2 | 11/2014 | Jayaraman et al. | |
| 8,909,928 B2 | 12/2014 | Ahmad et al. | |
| 8,918,510 B2 | 12/2014 | Gmach et al. | |
| 8,918,586 B1 | 12/2014 | Todd et al. | |
| 8,924,720 B2 | 12/2014 | Raghuram et al. | |
| 8,930,747 B2 | 1/2015 | Levijarvi et al. | |
| 8,935,500 B1 | 1/2015 | Gulati et al. | |
| 8,949,677 B1 | 2/2015 | Brundage et al. | |
| 8,996,837 B1 | 3/2015 | Bono et al. | |
| 9,003,086 B1 | 4/2015 | Schuller et al. | |
| 9,007,922 B1 | 4/2015 | Mittal et al. | |
| 9,009,427 B2 | 4/2015 | Sharma et al. | |
| 9,009,704 B2 | 4/2015 | McGrath et al. | |
| 9,075,638 B2 | 7/2015 | Barnett et al. | |
| 9,141,554 B1 | 9/2015 | Candelaria | |
| 9,141,785 B2 | 9/2015 | Mukkara et al. | |
| 9,164,795 B2 | 10/2015 | Vincent | |
| 9,176,677 B1 | 11/2015 | Fradkin et al. | |
| 9,201,704 B2 | 12/2015 | Chang et al. | |
| 9,203,784 B2 | 12/2015 | Chang et al. | |
| 9,207,882 B2 | 12/2015 | Rosset et al. | |
| 9,207,929 B2 | 12/2015 | Katsura | |
| 9,213,612 B2 | 12/2015 | Candelaria | |
| 9,223,564 B2 | 12/2015 | Munireddy et al. | |
| 9,223,634 B2 | 12/2015 | Chang et al. | |
| 9,244,761 B2 | 1/2016 | Yekhanin et al. | |
| 9,250,969 B2 | 2/2016 | Lager-Cavilla et al. | |
| 9,264,494 B2 | 2/2016 | Factor et al. | |
| 9,270,754 B2 | 2/2016 | Iyengar et al. | |
| 9,280,487 B2 | 3/2016 | Candelaria | |
| 9,304,815 B1 | 4/2016 | Vasanth et al. | |
| 9,313,048 B2 | 4/2016 | Chang et al. | |
| 9,374,270 B2 | 6/2016 | Nakil et al. | |
| 9,378,060 B2 | 6/2016 | Jansson et al. | |
| 9,396,251 B1 | 7/2016 | Boudreau et al. | |
| 9,448,877 B2 | 9/2016 | Candelaria | |
| 9,471,348 B2 | 10/2016 | Zuo et al. | |
| 9,501,473 B1 | 11/2016 | Kong et al. | |
| 9,503,523 B2 | 11/2016 | Rosset et al. | |
| 9,565,110 B2 | 2/2017 | Mullendore et al. | |
| 9,575,828 B2 | 2/2017 | Agarwal et al. | |
| 9,582,377 B1 | 2/2017 | Dhoolam et al. | |
| 9,614,763 B2 | 4/2017 | Dong et al. | |
| 9,658,868 B2 | 5/2017 | Hill | |
| 9,658,876 B2 | 5/2017 | Chang et al. | |
| 9,733,868 B2 | 8/2017 | Chandrasekaran et al. | |
| 9,763,518 B2 | 9/2017 | Charest et al. | |
| 9,824,005 B1 * | 11/2017 | Helliwell | G06F 12/023 |
| 9,830,240 B2 | 11/2017 | George et al. | |
| 9,853,873 B2 | 12/2017 | Dasu et al. | |
| 9,940,068 B2 | 4/2018 | Schorn et al. | |
| 10,303,534 B2 * | 5/2019 | Ganapathy | G06F 12/0269 |
| 2002/0049980 A1 | 4/2002 | Hoang | |
| 2002/0053009 A1 | 5/2002 | Selkirk et al. | |
| 2002/0073276 A1 | 6/2002 | Howard et al. | |
| 2002/0083120 A1 | 6/2002 | Soltis | |
| 2002/0095547 A1 | 7/2002 | Watanabe et al. | |
| 2002/0103889 A1 | 8/2002 | Markson et al. | |
| 2002/0103943 A1 | 8/2002 | Lo et al. | |
| 2002/0112113 A1 | 8/2002 | Karpoff et al. | |
| 2002/0120741 A1 | 8/2002 | Webb et al. | |
| 2002/0138675 A1 | 9/2002 | Mann | |
| 2002/0156971 A1 | 10/2002 | Jones et al. | |
| 2003/0023885 A1 | 1/2003 | Potter et al. | |
| 2003/0026267 A1 | 2/2003 | Oberman et al. | |
| 2003/0055933 A1 | 3/2003 | Ishizaki et al. | |
| 2003/0056126 A1 | 3/2003 | O'Connor et al. | |
| 2003/0065986 A1 | 4/2003 | Fraenkel et al. | |
| 2003/0084359 A1 | 5/2003 | Bresniker et al. | |
| 2003/0118053 A1 | 6/2003 | Edsall et al. | |
| 2003/0131105 A1 | 7/2003 | Czeiger et al. | |
| 2003/0131165 A1 | 7/2003 | Asano et al. | |
| 2003/0131182 A1 | 7/2003 | Kumar et al. | |
| 2003/0140134 A1 | 7/2003 | Swanson et al. | |
| 2003/0140210 A1 | 7/2003 | Testardi | |
| 2003/0149763 A1 | 8/2003 | Heitman et al. | |
| 2003/0154271 A1 | 8/2003 | Baldwin et al. | |
| 2003/0159058 A1 | 8/2003 | Eguchi et al. | |
| 2003/0174725 A1 | 9/2003 | Shankar | |
| 2003/0189395 A1 | 10/2003 | Doornbos et al. | |
| 2003/0210686 A1 | 11/2003 | Terrell et al. | |
| 2004/0024961 A1 | 2/2004 | Cochran et al. | |
| 2004/0030857 A1 | 2/2004 | Krakirian et al. | |
| 2004/0039939 A1 | 2/2004 | Cox et al. | |
| 2004/0054776 A1 | 3/2004 | Klotz et al. | |
| 2004/0057389 A1 | 3/2004 | Klotz et al. | |
| 2004/0059807 A1 | 3/2004 | Klotz et al. | |
| 2004/0088574 A1 | 5/2004 | Walter et al. | |
| 2004/0117438 A1 | 6/2004 | Considine et al. | |
| 2004/0123029 A1 | 6/2004 | Dalai et al. | |
| 2004/0128470 A1 | 7/2004 | Hetzler et al. | |
| 2004/0128540 A1 | 7/2004 | Roskind | |
| 2004/0153863 A1 | 8/2004 | Klotz et al. | |
| 2004/0190901 A1 | 9/2004 | Fang | |
| 2004/0215749 A1 | 10/2004 | Tsao | |
| 2004/0230848 A1 | 11/2004 | Mayo et al. | |
| 2004/0250034 A1 | 12/2004 | Yagawa et al. | |
| 2005/0033936 A1 | 2/2005 | Nakano et al. | |
| 2005/0036499 A1 | 2/2005 | Dutt et al. | |
| 2005/0050211 A1 | 3/2005 | Kaul et al. | |
| 2005/0050270 A1 | 3/2005 | Horn et al. | |
| 2005/0053073 A1 | 3/2005 | Kloth et al. | |
| 2005/0055428 A1 | 3/2005 | Terai et al. | |
| 2005/0060574 A1 | 3/2005 | Klotz et al. | |
| 2005/0060598 A1 | 3/2005 | Klotz et al. | |
| 2005/0071851 A1 | 3/2005 | Opheim | |
| 2005/0076113 A1 | 4/2005 | Klotz et al. | |
| 2005/0091426 A1 | 4/2005 | Horn et al. | |
| 2005/0114611 A1 | 5/2005 | Durham et al. | |
| 2005/0114615 A1 | 5/2005 | Ogasawara et al. | |
| 2005/0117522 A1 | 6/2005 | Basavaiah et al. | |
| 2005/0117562 A1 | 6/2005 | Wrenn | |
| 2005/0138287 A1 | 6/2005 | Ogasawara et al. | |
| 2005/0169188 A1 | 8/2005 | Cometto et al. | |
| 2005/0185597 A1 | 8/2005 | Le et al. | |
| 2005/0188170 A1 | 8/2005 | Yamamoto | |
| 2005/0198523 A1 | 9/2005 | Shanbhag et al. | |
| 2005/0235072 A1 | 10/2005 | Smith et al. | |
| 2005/0283658 A1 | 12/2005 | Clark et al. | |
| 2006/0015861 A1 | 1/2006 | Takata et al. | |
| 2006/0015928 A1 | 1/2006 | Setty et al. | |

(56) References Cited

U.S. PATENT DOCUMENTS

| | | |
|---|---|---|
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subramanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0252276 A1 | 10/2011 | Tsai et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0145220 A1 | 6/2013 | Lv |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |

(56) References Cited

U.S. PATENT DOCUMENTS

| | | |
|---|---|---|
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0351656 A1* | 11/2014 | Moser .................. G06F 11/366 714/45 |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |
| 2018/0121178 A1 | 5/2018 | Distefano et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM San Volume Controller Version 7.1, IBM® System Storage® San Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

(56) References Cited

OTHER PUBLICATIONS

Author Unknown, "Coraid Virtual DAS (VDAS) Technology: Eliminate Tradeoffs between DAS and Networked Storage," Coraid Technology Brief, ©2013 Cora id, Inc., Published on or about Mar. 20, 2013, 2 pages.
Author Unknown, "Creating Performance-based SAN SLAs Using Finisar's NetWisdom" May 2006, 7 pages, Finisar Corporation, Sunnyvale, California, U.S.A.
Author Unknown, "Data Center, Metro Cloud Connectivity: Integrated Metro SAN Connectivity in 16 Gbps Switches," Brocade Communication Systems, Inc., Apr. 2011, 14 pages.
Author Unknown, "Data Center, SAN Fabric Administration Best Practices Guide, Support Perspective," Brocade Communication Systems, Inc., May 2013, 21 pages.
Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.
Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer, Enabling Confidence in Application Performance Before Deployment," 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks an Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http//en.wikipedia.org/wiki/Standard_RAID_levels.
Author Unknown, "Storage Infrastructure for the Cloud," Solution Brief, © 2012, 3 pages; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "Vblock Solution for SAP: Simplified Provisioning for Operation Efficiency," VCE White Paper, VCE—The Virtual Computing Environment Company, Aug. 2011, 11 pages.
Aweya, James, et al., "Multi-level active queue management with dynamic thresholds," Elsevier, Computer Communications 25 (2002) pp. 756-771.
Berman, Stuart, et al., "Start-Up Jeda Networks in Software Defined Storage Network Technology," Press Release, Feb. 25, 2013, 2 pages, http://www.storagenewsletter.com/news/startups/ieda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh Siam International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," $13^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage in VMware vSph ere Environments," Version 8.0, $EMC^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.

(56) References Cited

OTHER PUBLICATIONS

Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23,-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, Ao, et al., "RAIDShield: Characterizing, Monitoring, and Proactively Protecting Against Disk Failures," FAST '15, 13$^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hip.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 the 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Petersen, Chris, "Introducing Lightning: A flexible NVMe JBOF," Mar. 9, 2016, 6 pages.
Pinheiro, Eduardo, et al., "Failure Trends in a Large Disk Drive Population," FAST '07, 5$^{th}$ USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.

Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-fowarding-00.pdf.
Schroeder, Bianca, et al., "Disk failures in the real world: What does an MTTF of 1,000,000 hours mean to you?" FAST '07: 5$^{th}$ USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10$^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Stamey, John, et al., "Client-Side Dynamic Metadata in Web 2.0," SIGDOC '07, Oct. 22-24, 2007, pp. 155-161.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "Ceph: Reliable, Scalable, and High-Performance Distributed Storage," Dec. 2007, 239 pages, University of California, Santa Cruz.
Weil, Sage A., et al. "Crush: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," Ceph, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.

\* cited by examiner

SYSTEM AND METHOD FOR SELF-HEALING OF APPLICATION CENTRIC INFRASTRUCTURE FABRIC MEMORY

CROSS-REFERENCE TO RELATED APPLICATIONS

This application is a continuation of U.S. application Ser. No. 15/654,906, filed on Jul. 20, 2017, the content of which is incorporated herein by reference in its entirety.

TECHNICAL FIELD

The present disclosure relates to garbage collection and more specifically to a method of collecting live process cores for a group of processes that have memory leak issues, transmitting the list to a cloud-based container for running a garbage detection on the live process cores, and transmitting back a list of leak address such that a respective process can to free the memory associated with the leak address.

BACKGROUND

A data-center fabric like Application Centric Infrastructure (ACI) could contain up to 400 leaf switches, each potentially running about 50 applications (e.g., linux processes, bgp processes, ospf processes), taking the total to about 20K linux processes. Like most embedded technology, ACI is built using C and C++, both of which are prone to memory leaks due to programming errors. Memory leaks can occur since there is no native garbage collection facility.

Applications leaking even a small amount of memory, such as 1 Kb per day each, can result in 20 MB of wasted memory per day. Such memory degradation is harmful in the long run and could cause serious side effects that include increased response time and non-recoverable process crashes. Moreover, running analytics on the entire fabric memory is close to impossible due to the sheer scale and volume of memory that needs to be analyzed.

Native in-memory garbage collection is getting popular, but is not even close to implementation for C and C++ especially in real-time fabric environments which are sensitive to time delays. Though C++ does have explicit garbage collection facilities like smart pointers, there has been no progress on providing an implicit garbage collector. One of the main reasons for this could be the fear of performance impact. For example, "mark and sweep" garbage collection freezes everything in the process while it is at work. Even milliseconds of paused processing can impact real-time embedded systems.

In essence, for the millions of embedded systems that use C/C++, proper garbage collection is not yet a reality and the only solution at the moment is to kill and restart the offending process.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The method includes obtaining a list of processes in an application centric infrastructure fabric, sorting the list of processes according to an amount of memory increase associated with each respective process in the list of processes to yield a sorted list, selecting a group of processes from the sorted list and collecting a respective live process core for each process in the group of processes without pausing or killing any process in the group of processes. The method includes applying an offline leak detection tool to each process in the group of processes to yield a list of leaked memory addresses for a given process of the group of processes and transmitting a message to the given process with the list of leaked memory addresses. The given process calls a function to release leaked memory associated with the given process as identified in the message.

Detailed Description

The present disclosure addresses the issues raised above. The disclosure provides a system, method and computer-readable storage device embodiments. First a general example system shall be disclosed in FIG. 1 which can provide some basic hardware components making up a server, node or other computer system.

Figure 1:
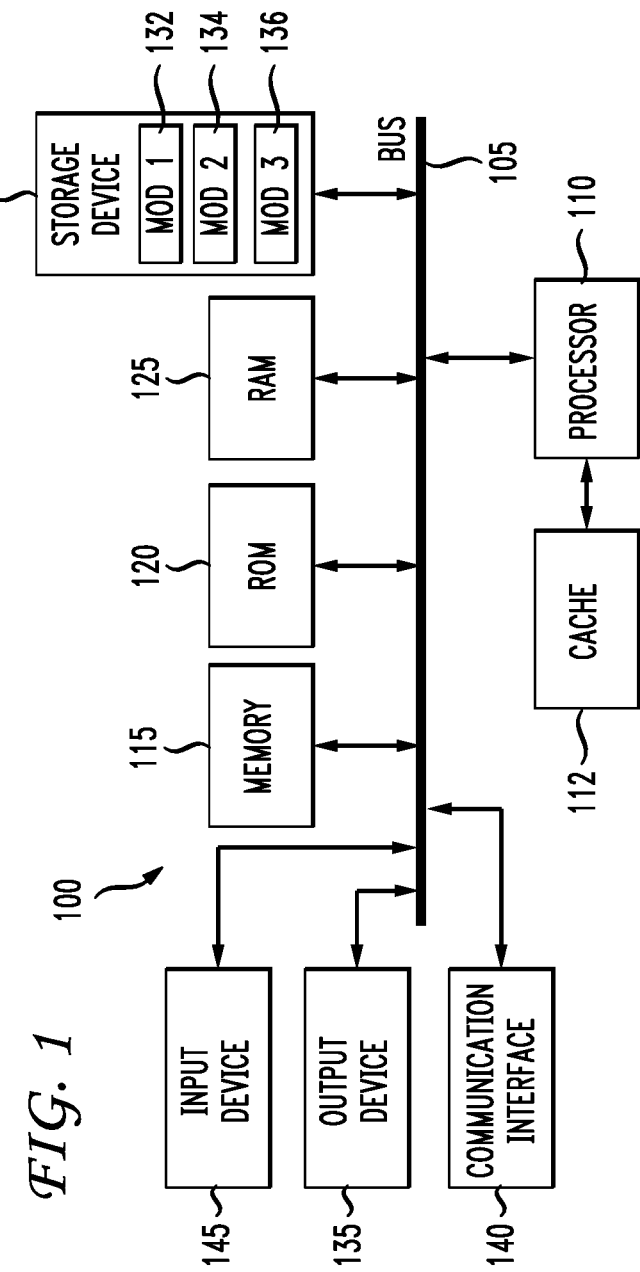
FIG. 1 illustrates an example system configuration.

First a general example system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 2:
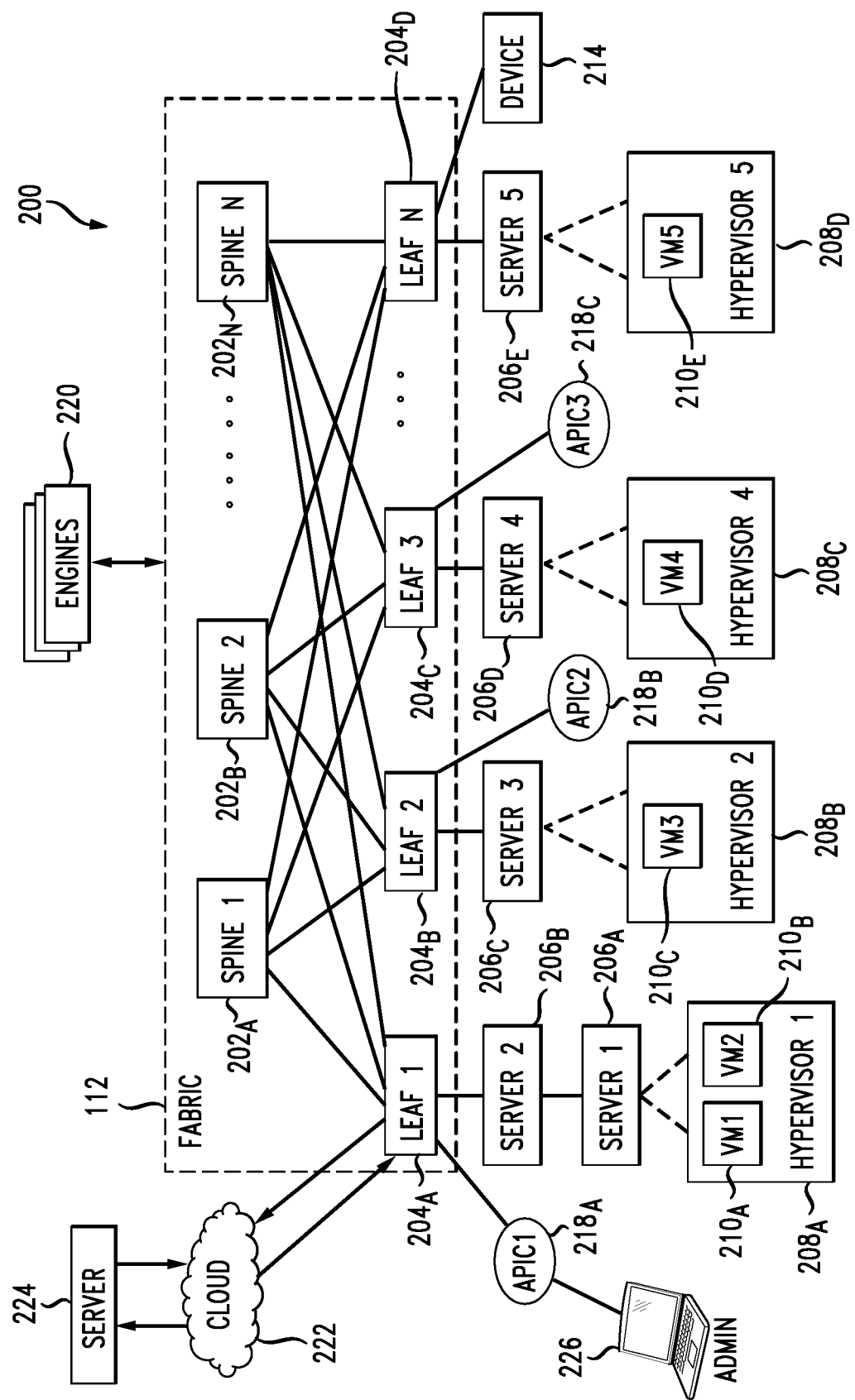
FIG. 2 illustrates a Application Centric Infrastructure.

Having introduced the basic computing components which can be applicable to embodiments associated with this disclosure, the disclosure now turn to FIG. 2 which illustrates an example network environment.

FIG. 2 illustrates a diagram of example network environment 200. This figure is discussed with the concept of capturing agents on various network components. With reference to FIG. 2, fabric 212 can represent the underlay (i.e., physical network) of network environment 200. Fabric 212 can include spine routers 1-N (202A-N) (collectively "202") and leaf routers 1-N (204A-N) (collectively "204"). Leaf routers 204 can reside at the edge of fabric 212, and can thus represent the physical network edges. Leaf routers 204 can be, for example, top-of-rack ("ToR") switches, aggregation switches, gateways, ingress and/or egress switches, provider edge devices, and/or any other type of routing or switching device.

Leaf routers 204 can be responsible for routing and/or bridging tenant or endpoint packets and applying network policies. Spine routers 202 can perform switching and routing within fabric 212. Thus, network connectivity in fabric 212 can flow from spine routers 202 to leaf routers 204, and vice versa.

Leaf routers 204 can provide servers 1-5 (206A-E) (collectively "206"), hypervisors 1-4 (208A-208D) (collectively "208"), and virtual machines (VMs) 1-5 (210A-210E) (collectively "210") access to fabric 212. For example, leaf routers 204 can encapsulate and decapsulate packets to and from servers 206 in order to enable communications throughout environment 200. Leaf routers 204 can also connect other devices, such as device 214, with fabric 212. Device 214 can be any network-capable device(s) or network(s), such as a firewall, a database, a server, an engine 220 (further described below), etc. Leaf routers 204 can also provide any other servers, resources, endpoints, external networks, VMs, services, tenants, or workloads with access to fabric 212.

VMs 210 can be virtual machines hosted by hypervisors 208 running on servers 206. VMs 210 can include workloads running on a guest operating system on a respective server. Hypervisors 208 can provide a layer of software, firmware, and/or hardware that creates and runs the VMs 210. Hypervisors 208 can allow VMs 210 to share hardware resources on servers 206, and the hardware resources on servers 206 to appear as multiple, separate hardware platforms. Moreover, hypervisors 208 and servers 206 can host one or more VMs 210. For example, server 206A and hypervisor 208A can host VMs 210A-B.

In some cases, VMs 210 and/or hypervisors 208 can be migrated to other servers 206. For example, VM 210A can be migrated to server 206C and hypervisor 208B. Servers 206 can similarly be migrated to other locations in network environment 200. A server connected to a specific leaf router can be changed to connect to a different or additional leaf router. In some cases, some or all of servers 206, hypervisors 208, and/or VMs 210 can represent tenant space. Tenant space can include workloads, services, applications, devices, and/or resources that are associated with one or more clients or subscribers. Accordingly, traffic in network environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

An administrator from a device 226 can communicate with one or more application policy infrastructure controllers $218_A$, $218_B$, $218_C$ (collectively APICs 218). The administrator can push a policy from their device 226 to one or more of the APICs 218, which can transmit the garbage collection policy to a respective Leaf node or nodes 204 according to the principles disclosed herein to perform garbage collection. A Leaf node 204 can transmit a live process core that is collected and pushed over the cloud 222 (or any network) to a container running on a server 224. The server 224 can run a garbage detection tool on the live process core and send back a list of leaked addresses. The list of leaked addresses can be received at a leaf 204 and the process can "walk" over each address in the list and call a function such as free ( ), or some other function, to perform garbage collection. The details of this process will be set forth in more detail below.

Figure 3:
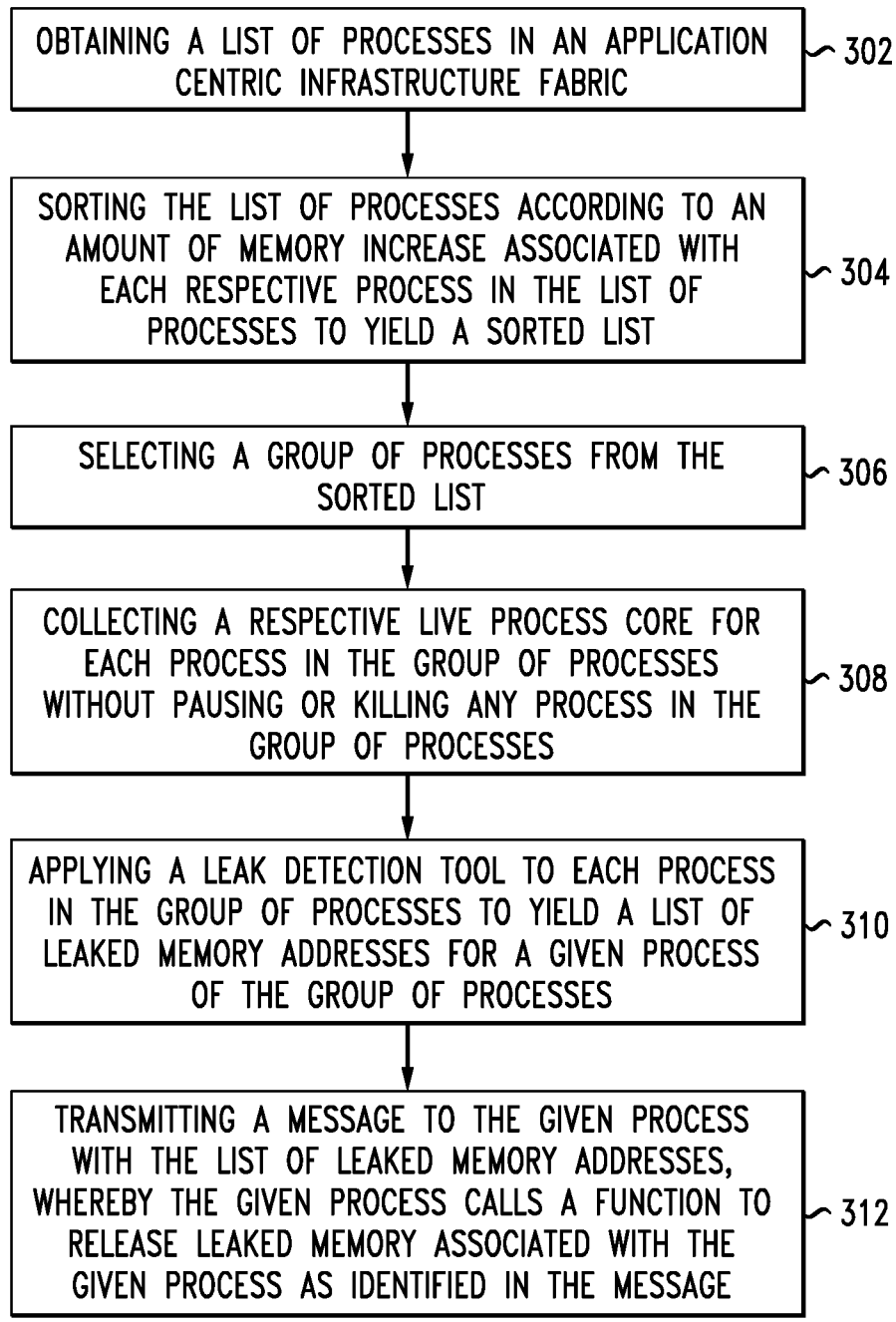
FIG. 3 illustrates a method embodiment.

Having introduced the basic ACI environment, the disclosure turns to FIG. 3, which provides an example method embodiment according to the solution and enables a scalable, non-intrusive guard garbage collection method in traditional embedded networking devices. Absent the solution as disclosed herein, it is not possible to provide such a scalable garbage collection approach. One benefit of the approach is that it will work on already deployed network fabrics.

The present approach can run on all processes and according to the solution disclosed herein, an administrator, or a system can pick and choose which processes to apply the method to. In regular garbage collection, a process must be paused during the process of cleaning up memory leaks. According to the present approach, a respective process is not paused during the course snapshot.

In traditional approaches, garbage detection and collection are both done within a process context. According to the disclosed approach, the memory analysis, or garbage detection, is done in the cloud and collection is done within the process context using a special message as disclosed herein. Finally, in traditional garbage collection, the process is computationally expensive and can consume many CPU cycles. The approach disclosed herein is virtually nonintrusive to the running process in that much of the solution is executed in the cloud.

FIG. 3 illustrates an example method embodiment. The example method includes obtaining a list of processes in an application centric infrastructure fabric (302), sorting the list of processes according to an amount of memory increase associated with each respective process in the list of processes to yield a sorted list (304), selecting a group of processes from the sorted list (306) and collecting a respective live process core for each process in the group of processes without pausing or killing any process in the group of processes (308). The method can also include applying a leak detection tool to each process in the group of processes to yield a list of leaked memory addresses for a given process of the group of processes (310) and transmitting a message to the given process with the list of leaked memory addresses, whereby the given process calls a function to release leaked memory associated with the given process as identified in the message (312). The leak detection tool can be an offline tool. An example tool that could be used to perform the step of selecting the top "n" processes to collect the live process core could include proprietary tools such as the one disclosed in U.S. Pat. No. 9,558,055, incorporated herein by reference. Other tools could be utilized as well.

The list of processes can include all processes in the application centric infrastructure fabric or can consist of a group of selected processes from all processes within the application centric infrastructure fabric, according to a criterion. The criteria can be based on a rate of memory leak, a percentage of memory leak relative to some parameter which can be process based or ACI fabric based, cost based, workload based, predictive data based, or according to any other parameter.

In one aspect, the method includes applying the leak detection tool in a container located in a cloud computing environment. In such a scenario, the method can include transmitting the respective live process core to a container running in a cloud computing environment for applying the leak detection tool. The benefit of doing an offline memory leak detection process is that a process core's file should have all the data necessary to detect leaks. The core has the complete memory foot-print of all the processes along with all the memory that were ever allocated by it on the heap.

In another aspect, the method can include transmitting the respective live process core off-line to a container on a same (or different) switch for applying the leak detection tool. Any tool can be used to perform the individual functions disclosed herein. Any memory leak detection tool could be utilized to detect memory leaks. Any tool or process that performs the function of detecting memory leaks could be applied.

Existing technologies involve optimizing an algorithm for native in-memory garbage collection techniques. Garbage collection itself is an expensive operation and more often than not involves pausing the process in order to clean up memory. An example tool for collecting a live process without pausing the process can include Google's Coredumper library (see https://github.com/anatol/google/google-coredumper). Not only does this disclosure make garbage collection possible in C/C++ based legacy applications, but the concepts let the system do the expensive garbage detection outside the ACI fabric (inside a container in the cloud), thereby making the entire operation non intrusive.

Moreover, the concepts disclosed herein can potentially work on solutions that have currently been deployed. The approach is platform and operating system agnostic and can work across any embedded system using standard glibe library for memory allocation.

Figure 4:
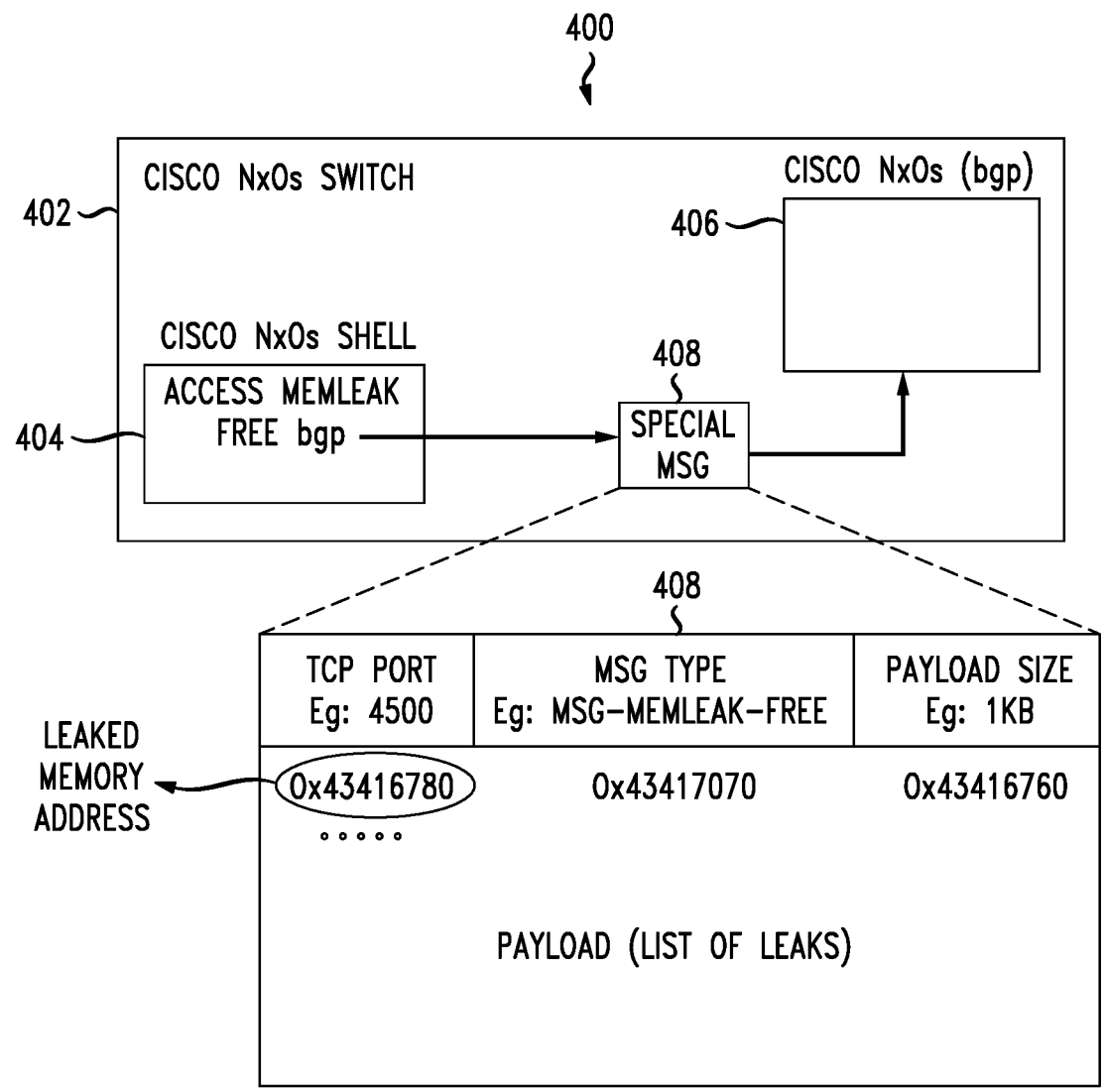
FIG. 4 illustrates a switch and a messaging being sent to an operating system process.

The concepts disclosed herein allow in-memory garbage collection for native C/C++ based applications with the least possible intrusion to the running system and without pausing or killing the running application. The concept enables a system to execute the expensive garbage detection (data analytics) in a container located in the cloud, in one aspect, and then send in a message in another mode the list of memory addresses that have been leaked to the a respective application process in order to be freed. FIG. 4 illustrates several components 400 including a switch 402 and a message 408 for releasing memory. The message 408 can have a list of leaks and data that could include, for example, a TCP Port identification (such as 4500), a message type (such as msg_memleak_fre) and a payload size (such as 1 Kb). The message could include a leaked memory address such as 0x43416780, for example.

Aspect of this disclosure also include predictive measures that can be developed based on machine learning or artificial intelligence such that memory leak decisions, messages or assignments can be predicted in advance and even transmitted in some cases before the memory issue arises. As shown in FIG. 4. the message 408 could be sent from an operating system switch 402 (Such as Cisco NX-OS switch) having an operating system shell 404 which can be used to transmit a special message 408 to an operating system process 406 such as (a border gateway protocol process).

Figure 5:
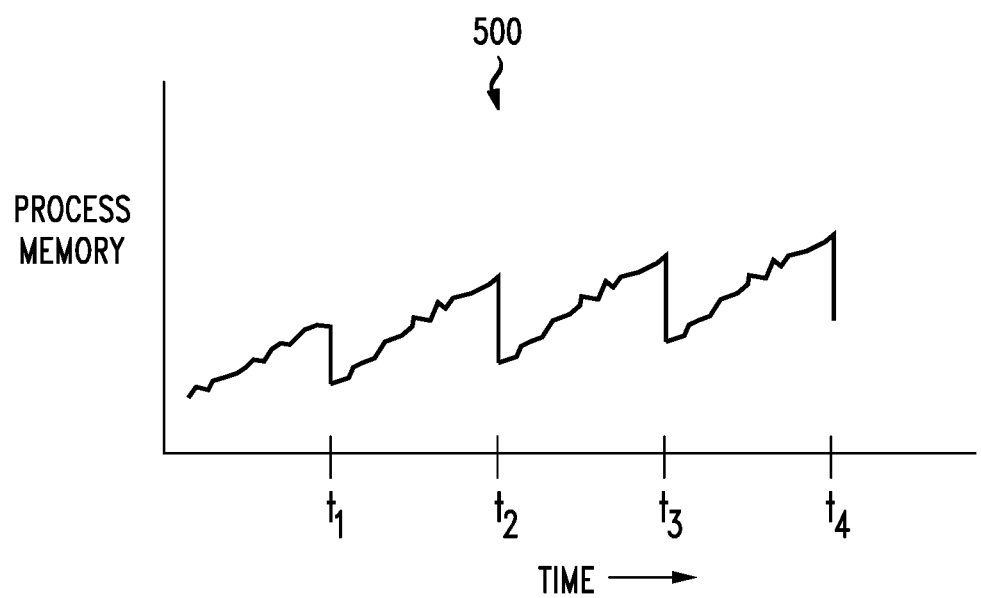
FIG. 5 illustrates and effect over time of memory leaks when the concepts disclosed herein are applied.

Applying the approach disclosed herein can result in a sawtooth configuration of the process memory over time, as is shown in the graph 500 of FIG. 5. For example, the process memory may increase over time until an instant when a message is sent to the process to free the memory associated with the memory leak. In response to the message and implementation of the memory release, the process memory would be reduced only to start rising again until the next message is acted on to again release memory. Some of the increase in process memory could be caused by regular operation of the process as well and not due to leakage.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other. For example, while some specific protocols such as 802.11 and 802.3 are mentioned in the examples above, the principles could apply to any communication protocol and does not have to be limited to these particular protocols. Any configuration in which received data is acknowledged through an ACK signal could implement the concepts disclosed herein.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   collecting a respective live process core for each process in a group of processes without pausing or killing any process in the group of processes;
   applying a leak detection tool to each process in the group of processes to yield a list of leaked memory addresses for a given process of the group of processes; and
   transmitting a message to the given process with the list of leaked memory addresses, whereby the given process calls a function to release leaked memory associated with the given process as identified in the message.

2. The method of claim 1, wherein the group of processes comprises all processes in an application centric infrastructure fabric.

3. The method of claim 1, wherein the group of processes comprises a group of selected processes from all processes within an application centric infrastructure fabric, according to a criteria.

4. The method of claim 1, wherein applying the leak detection tool occurs in a container located in a cloud computing environment.

5. The method of claim 1, further comprising:
   transmitting the respective live process core off-line to a container on a same switch for applying the leak detection tool.

6. The method of claim 1, further comprising:
transmitting the respective live process core to a container running in a cloud computing environment for applying the leak detection tool.

7. A system comprising:
at least one processor; and
a computer-readable media storing instructions which, when executed by the at least one processor, cause the at least one processor to perform operations comprising:
collecting a respective live process core for each process in a group of processes without pausing or killing any process in the group of processes;
applying a leak detection tool to each process in the group of processes to yield a list of leaked memory addresses for a given process of the group of processes; and
transmitting a message to the given process with the list of leaked memory addresses, whereby the given process calls a function to release leaked memory associated with the given process as identified in the message.

8. The system of claim 7, wherein the group of processes comprises all processes in an application centric infrastructure fabric.

9. The system of claim 7, wherein the group of processes comprises a group of selected processes from all processes within an application centric infrastructure fabric, according to a criteria.

10. The system of claim 7, wherein applying the leak detection tool occurs in a container located in a cloud computing environment.

11. The system of claim 7, wherein the computer-readable media stores additional instructions which, when executed by the at least one processor, cause the at least one processor to perform operations further comprising:
transmitting the respective live process core off-line to a container on a same switch for applying the leak detection tool.

12. The system of claim 7, wherein the computer-readable media stores additional instructions which, when executed by the at least one processor, cause the at least one processor to perform operations further comprising:
transmitting the respective live process core to a container running in a cloud computing environment for applying the leak detection tool.

13. A non-transitory computer-readable media storing instructions which, when executed by a processor, cause the processor to perform operations comprising:
collecting a respective live process core for each process in a group of processes without pausing or killing any process in the group of processes;
applying a leak detection tool to each process in the group of processes to yield a list of leaked memory addresses for a given process of the group of processes; and
transmitting a message to the given process with the list of leaked memory addresses, whereby the given process calls a function to release leaked memory associated with the given process as identified in the message.

14. The non-transitory computer-readable media of claim 13, wherein the group of processes comprises all processes in an application centric infrastructure fabric.

15. The non-transitory computer-readable media of claim 13, wherein the group of processes comprises a group of selected processes from all processes within an application centric infrastructure fabric, according to a criteria.

16. The non-transitory computer-readable media of claim 13, wherein applying the leak detection tool occurs in a container located in a cloud computing environment.

17. The non-transitory computer-readable media of claim 13, wherein the non-transitory computer-readable media stores additional instructions which, when executed by the processor, cause the processor to perform operations further comprising:
transmitting the respective live process core off-line to a container on a same switch for applying the leak detection tool.

18. The non-transitory computer-readable media of claim 13, wherein the non-transitory computer-readable media stores additional instructions which, when executed by the processor, cause the processor to perform operations further comprising:
transmitting the respective live process core to a container running in a cloud computing environment for applying the leak detection tool.

* * * * *